UNITED STATES PATENT OFFICE.

CLIFFORD RICHARDSON, OF NEW YORK, N. Y.

BITUMINOUS SUBSTANCE.

1,198,955.

Specification of Letters Patent.    Patented Sept. 19, 1916.

No Drawing.    Application filed July 25, 1914.   Serial No. 853,190.

*To all whom it may concern:*

Be it known that I, CLIFFORD RICHARDSON, residing at New York city, in the county and State of New York, have invented certain new and useful Improvements in Bituminous Substances, whereof the following is a specification.

My invention relates to improvements in bituminous substances whereby I produce such substances in a condition having a higher degree of body or stability than heretofore produced.

It has heretofore been well known that the addition of finely divided mineral matter to bituminous substances increases their body and this has been availed of in the paving and other arts. Thus, in the making of a bituminous paving mixture, it has been customary to add to the bitumen, in addition to the coarser mineral aggregate, a certain proportion of impalpable powder and the utility of this addition has been recognized.

According to my invention, I obtain an increased degree of body or stability in these bituminous substances, by means of the addition to and intimate and uniform dispersion through the bituminous substance of a proper proportion of a substance in the state of a disperse colloid.

In this specification when I use the phrase bituminous substance, I wish it to be understood that I am including not only those substances which are more accurately classified as bituminous whether native or artificial, but also substances which exhibit similar characteristics. For example, I am referring not only to the native bitumen and to the residual pitches which are the products of the distillation of petroleum, but I am also referring to the coal tar pitches and like substances.

I will illustrate my invention with reference to its application to the improvement of residual pitches, such as are commonly used in the paving arts, but this will be understood as being an illustration, rather than a restriction of my invention.

I will also illustrate my invention more particularly with relation to its application to the paving arts, but it must be understood that its application is not thus limited, because increase of the body or stability in a bituminous substance is a useful quality which may be availed of in many arts.

Substances which form apparently homogeneous solutions in liquids and which are not removed therefrom by ordinary filters but which will not diffuse through a membrane and observation of which under the ultra-microscope shows to be dispersed in solid form, are known as "disperse colloids."

In order to practice my invention I employ a proper substance, for example a fine clay having within it a sufficient proportion of matter capable of colloidal dispersion in relation to water as can be ascertainable by proper examination. Ordinarily, the disperse colloid is associated with a larger amount of fine material not in such colloidal state.

If it be desired to remove or reduce the proportion of coarser particles in the substance to be added to the bitumen and thereby increase the proportion of disperse colloid, a treatment of the clay, or other substance, (as by elutriation), or by any of the well known processes used in the treatment of ore for the separation of fine material, may be resorted to, whereby the particles other than those which are in a colloidal state are removed or reduced in quantity.

An aqueous paste is made by the addition of water to such disperse colloid with or without other fine particles associated with it. This paste is added to a bituminous substance in proportions varying with the object for which the material is to be used as in the addition of ordinary fillers to mixtures in the construction of asphalt pavements. The amount of disperse colloid should be at least one or two per cent. but may be increased to any percentage at which the bitumen will melt and flow. The amount of such material must not, however, be so great as to prevent the bitumen from constituting a continuous phase in relation to the clay dispersed therethrough. Proper agitation of the paste and the bitumen with steam or air will effect an emulsification of the two components.

The water with which the disperse colloid has been associated is then removed by evaporation or distillation which at the same time may be carried to the point of removing more or less volatile matter from the bituminous substance for the purpose of regulating its consistency. Thereby the bitumen is caused to take the place of the water as the continuous phase throughout which is dispersed the clay or similar substance which was previously dispersed in the paste.

As an example of the advantageous practice of my invention in connection with the paving industry, I may add to any crude petroleum, maltha or liquid residum from the distillation thereof, or bitumen liquid below the temperature of boiling water, to be used in the preparation of a flux or a residual pitch, from twenty to fifty per cent. of a liquid paste consisting of water and clay containing disperse collodial matter, varying in amount according to the quality of the clay, but, of course, the more desirable the larger percentage of this material although the coarser portion may be looked upon as desirable as an ordinary filler, although undesirable if it is sufficiently coarse to settle out during distillation and thus form a cake or coke upon the walls of the still. This combination is emulsified by passing through it steam or air or by other means of agitation, at the same time evaporating the water and distilling off some or all of the more volatile portions of the bitumen, according to the uses to which the resulting residual pitch is to be put in the preparation of asphaltic cements for paving mixtures.

By accomplishing the addition of the disperse colloid to the bituminous substance, in the form of aqueous paste, I am able to secure its dispersion throughout and intimate association with the bituminous substance in a thoroughly uniform manner. No such result or product has been secured, where attempts have heretofore been made to add finely divided mineral matter directly to a bituminous substance in the attempt to thereby secure increased stability of the product. I believe my improved result to be due to the uniform dispersion secured by adding to the bitumen the finely divided matter in the state of a disperse colloid already intimately combined with water. This accomplishes a similar dispersion of the substance throughout the bitumen, notwithstanding the subsequent removal of the water.

Having thus described my invention, I claim:

1. A bituminous substance having its body and stability increased by the addition to it of a proportion of colloidal matter intimately and uniformly dispersed throughout the bituminous substance, of which a sufficient quantity is provided for it to form the continuous phase of the colloidal system thereby produced.

2. A bituminous paving cement consisting of a bituminous substance having added to it and uniformly dispersed through it, with formation of a colloidal system, a suitable proportion of clay, containing a high percentage of matter fine enough to be capable of colloidal dispersion in relation to water.

In testimony whereof, I have hereunto signed my name, at New York, New York, this twenty-third day of July, 1914.

CLIFFORD RICHARDSON.

Witnesses:
FRANK D. HOPLEY,
GEO. R. OLNEY.